May 6, 1930.  P. A. E. ARMSTRONG  1,757,790
PROCESS OF MAKING REENFORCED NONCORROSIVE STEEL
Filed Jan. 5, 1922  2 Sheets-Sheet 1
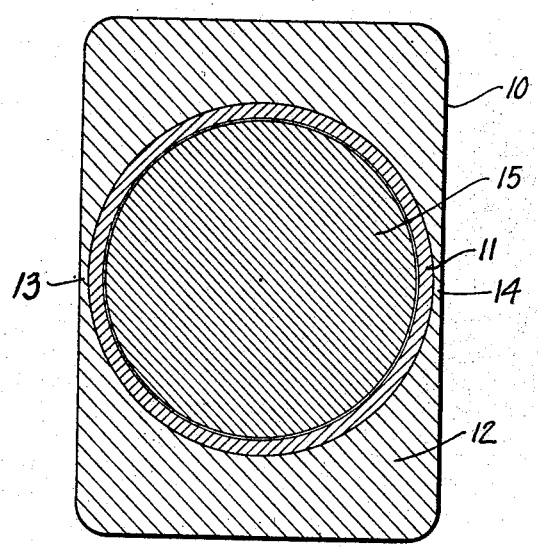
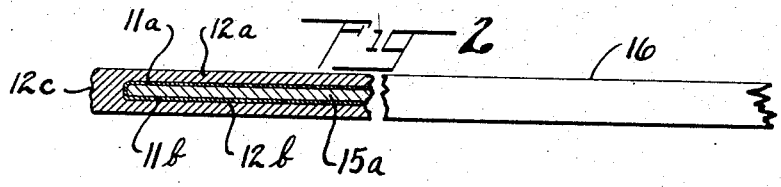
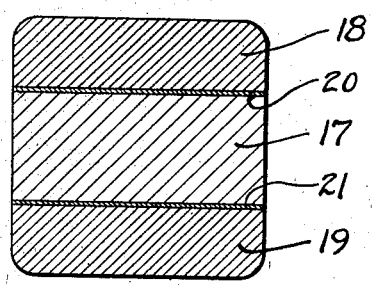
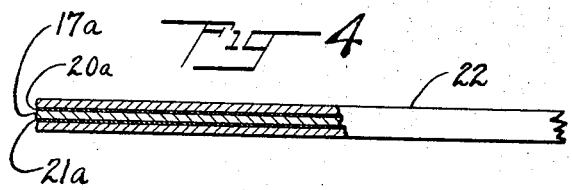
INVENTOR
P. A. E. Armstrong
BY H. H. Dyke
ATTORNEY May 6, 1930.   P. A. E. ARMSTRONG   1,757,790
PROCESS OF MAKING REENFORCED NONCORROSIVE STEEL
Filed Jan. 5, 1922   2 Sheets-Sheet 2
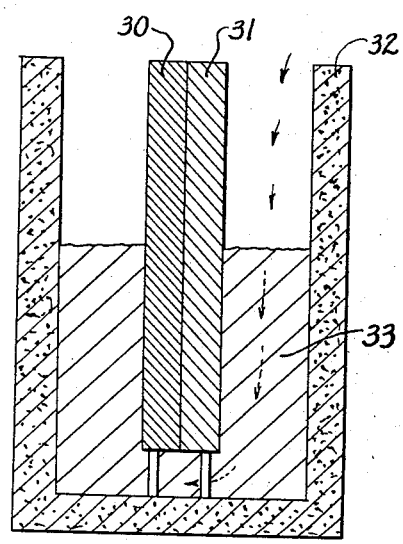
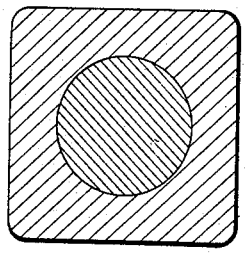
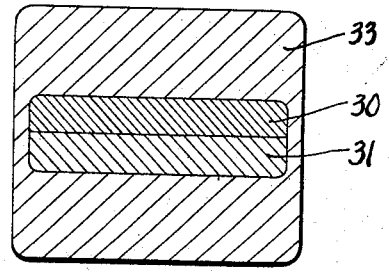
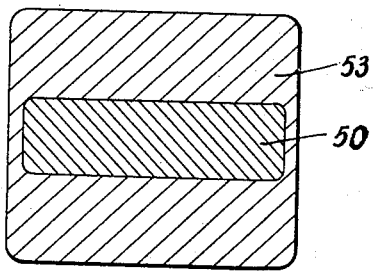
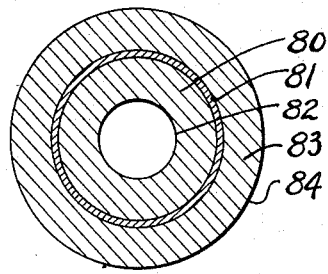
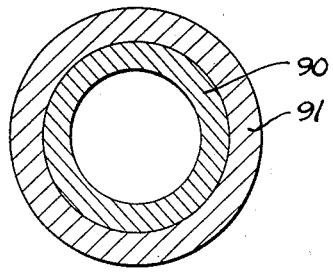
Percy A. E. Armstrong INVENTOR
BY H. H. Dyke ATTORNEY Patented May 6, 1930

1,757,790

UNITED STATES PATENT OFFICE

PERCY A. E. ARMSTRONG, OF LOUDONVILLE, NEW YORK, ASSIGNOR TO LUDLUM STEEL COMPANY, OF WATERVLIET, NEW YORK, A CORPORATION OF NEW JERSEY

PROCESS OF MAKING REENFORCED NONCORROSIVE STEEL

Application filed January 5, 1922. Serial No. 527,225.

Uses of non-corrosive steel having heretofore been comparatively limited because its cost is somewhat more than that of ordinary steel, and because it is somewhat more difficult to work. By the present invention the characteristic surface advantages of non-corrosive steel are retained and at the same time the product both cheapened and made easier to work.

These results are secured in accordance with my invention by making the surface portion of the material in the form of sheets, bars, etc., of the non-corrosive steel and the interior portion of cheaper and more ductile material, as iron, mild steel and the like.

The composite product so made up to be of use should have its parts securely welded together. The process of the present invention has for one of its objects the bringing about of successful welding in material of this character and doing away with the difficulties heretofore encountered in the welding of non-corrosive alloy steel containing substantially high percentages of nickel, silicon, chromium and the like, to material such as mild steel.

Successful welding action is secured according to my invention by inserting in the ingot mold, for making ingots to be reduced to sheet, bar, etc., form by mechanical working, as by rolling, a tubular reenforce member of tough ductile material, such as mild steel for example, casting the non-corrosive steel about this tubular member between it and the walls of the ingot mold and filling the space within the tubular member with tough ductile material, as mild steel, by inserting or casting same therein, after which the ingot so produced is rolled or otherwise mechanically hot worked into desired forms.

In casting the alloy steel about the comparatively thin walled tube, the tube is quickly heated by the molten metal, and a satisfactory weld is readily formed. There appears to be a migration of carbon in forming the weld, and during the process of subsequent reheating and mechanical working, the carbon of the non-corrosive steel in such neighborhood being apparently reduced and that of the mild steel tube increased somewhat. Further no cracking of ingots takes place, as in casting about a solid bar, since the hot, thin, relatively weak tube can be readily compressed or reduced in size on application of pressure thereto, as in the cooling of the cast metal.

The interior of the tube is filled with metal, preferably of substantially the same composition as the tube itself. This may be done by casting, but preferably a bar is inserted, the outside of the bar and inside of the tube being freed of oxides, as by pickling, and the whole being heated up and rolled down together, the bar is welded to the tube made of the same material. The resulting composite wrought sheet or bar is substantially integral, the cast ingot material being welded to the outside of the tube in casting, and the inside bar welded to the inside of the tube by heating and rolling down.

In the drawings Fig. 1 is a cross-sectional view of an ingot cast about a tube in which a bar is inserted. Fig. 2 is a cross-sectional view of a rolled sheet made from the composite ingot of Fig. 1. Fig. 3 is a cross-sectional view of an ingot in which thin plates are used instead of a continuous tube and the center material is cast between these plates, and Fig. 4 is a cross-sectional view of a rolled sheet made by rolling down the composite ingot or billet of Fig. 3.

Fig. 5 is a vertical sectional view of a mold and an ingot formed therein, a part of the ingot being broken away. Fig. 6 is a cross-sectional view of an ingot so formed. Fig. 7 is a cross-sectional view of a modified form of ingot. Fig. 8 is a cross-sectional view of another modified form of ingot. Figs. 9 and 10 are cross-sectional views of laminated tubes constructed in accordance with my invention.

In casting the ingot 10 of Fig. 1, a tube 11 is inserted in the mold and the molten non-corrosive alloy material 12 cast about it, the interior of the tube being preferably filled during the casting with a non-conductor, such as lime, for example. The tube 11 preferably extends fairly close to the walls of the mold at two opposite points or regions as at 13 and 14 in order to avoid waste of the relatively expensive material 12 in rolling. This is not essential, however, as excess non-corrosive alloy material can be trimmed off the edges, if desired, and used for remelting in casting further ingots.

In casting, the thin tube 11 heats up rapidly and becomes firmly welded to the non-corrosive alloy material. Migration of carbon appears to be involved in the welding action, which takes place during casting the ingot and during subsequent reheating and mechanical working, as for example, if the material of the tube is low carbon steel with, say .05% of carbon, and the alloy material cast around it has, say, .40% of carbon, then the resulting welded portion may contain about an average carbon content of about .225% carbon. It is to be understood, however, that such theory and figures are merely illustrative. At any rate, whatever the explanation may be, a true and effective weld is formed and the ingot material formed about the tube is solid and free from cracks.

When the material for the center is inserted in bar form, the bar 15 and the inside of tube 11 are freed from oxide, as by pickling, and the bar 15, which is preferably of the same material as tube 11, inserted. The composite billet so made up is heated and rolled to desired shape as, for example, into sheet form as shown in Fig. 2, the center bar 15 becoming firmly welded to the interior of tube 11 by the heating and working treatment.

The resulting rolled product, as the sheet 16 of Fig. 2, comprises the upper and lower surface layers 12$^a$ and 12$^b$ of the non-corrosive alloy material which also extends to the edges of the sheet as at 12$^c$, the center 15$^a$ and the interposed portions 11$^a$ and 11$^b$ formed from tube 11 and which are, of course, very thin in the rolled sheet.

The percentages of center material and non-corrosive surface material may, of course, be varied to suit requirements. In roof sheets, for example, the center material may make up the greater part of the sheet with only relatively thin layers of the non-corrosive surface material, and the carbon migration may extend throughout the sheet, in hot working, thus reducing the carbon content of the surface material.

In Fig. 3 I have shown a billet or ingot made by casting the center material 17 between and the non-corrosive surface material 18 and 19 on the outside of a pair of thin sheets 20, 21. This casting is preferably done simultaneously and results in welding on both sides of the interposed sheets. When such billets are rolled down, as to sheets 22, Fig. 4, the edges 17$^a$, 20$^a$ and 21$^a$ of relatively corrodible material are, of course, exposed, but corrosion cannot progress very far on such edges even if exposed, and if desired, as in ship plates, for example, coating as by painting or the like may be resorted to to protect such exposed edges from corrosion.

In the modified form shown in Figs. 5 and 6, a bar formed of a pair of mild or other steel billets 30 and 31, is inserted into a mold 32 and the molten non-corrosive alloy material 33 is cast around it. The resulting product, a cross-section of which is shown in Fig. 6, may be elongated into bars of desired dimensions or rolled into sheets of the general character of that of Fig. 4, after cooling the ingot it may be broken in half at the line where the billets come together; thus separating it into two parts, each of these parts comprising a layer of alloy material and another layer of steel. If necessary the ingot may be cut into at along the plane where the billets come together, whereupon the parts may readily be broken apart. There will thus be obtained a duplex material which may be employed where only one surface need be non-corrosive.

In forming the modified form shown in Fig. 7, a bar 50 of mild or other steel, or of iron, is inserted into the mold and the molten non-corrosive alloy material 53 is cast around it. The resulting ingot of Fig. 7 may be rolled into a sheet, such a sheet having laminations of unlike materials. It will be noted that there is substantially complete utilization of the non-corrosive material, the edges of the sheet having substantially no non-corrosive material not reinforced.

The invention may also be employed in the construction of laminated metal tubes. One form of tube is shown in Fig. 9, and comprises a tube 81 of mild or other steel forming a reenforce for the entire tube. The complete tube may be formed by inserting the steel tube 81 into a mold intermediate the sand core and the mold wall. Molted non-corrosive alloy material is then poured in the space between the interior face of the tube 81 and the surface of the sand core, the latter surface being represented by the line designated 82 in the drawing. Similarly, molten non-corrosive alloy material is poured in the space between the exterior of the tube 81 and the wall of the mold, the surface of the wall being represented by the line designated 84 in the drawing. There is thus cast a laminated tube having the laminations 81, 80 and 83, the layer 81 being of steel protected on both sides by the non-corrosive layers 80 and 83. Such laminated tubes may be employed in condensers, and for conducting acid, and also for conducting water or steam particularly when the water or steam contains harmful impurities.

A modified form of tube is shown in Fig. 10, in which the complete tube comprises two substantially concentric layers 90 and 91 of unlike materials. In some cases the inner layer 90 is formed of mild steel or the like, and the outer layer 91 is of non-corrosive alloy material, and in other cases the inner layer 90 is of non-corrosive alloy material while the outer layer is of steel, according to the use to which the complete tube is to be put. In forming a tube of Fig. 10 in which the inner layer is of steel, a steel tube is inserted into a mold and molten non-corrosive alloy material is cast around it, thus forming a laminated tube as described. If the outer layer 91 is to be of steel, a tube of non-corrosive alloy is inserted into a mold and molten steel cast around it. Such laminated tubes may be employed in the construction of bedsteads and the like.

Reenforced non-corrosive alloy products such as described are adapted for many uses. Automobile valves when made with a soft center and a non-corrosive surface are readily forged and stand up well in use. Steel cables made with a non-corrosive alloy surface and center of mild steel or nickel steel are strong and rust resisting. Wire for electrical resistance or electrical heating purposes having an outer shell of non-corrosive alloy of high electrical resistance may be made with a core of mild steel, for example, the core for such material being preferably of relatively small cross-section so as to avoid too great reduction of electrical resistance. The sheet material is adapted for very numerous uses, as for pots and pans, cutlery, roofing plates, guttering, washing machines, condensers, water, steam or acid pipes, jail bar, safes, bank vaults, turbine bucket blades, etc.

Where the center is of low carbon steel this may be taken advantage of to reduce the carbon in the non-corrosive surface material so that sheets may be made, for example, in which the carbon content of the non-corrosive surface material is substantially reduced by carbon migration between same and the low carbon steel center, thus imparting to the surface material the additional resistance to corrosion, rust, etc., which results from lowering of its carbon content, and making available for such surface material of alloys initially higher in carbon than would otherwise be admissible with a resultant cheapening in cost. The carbon migration referred to may take place as well during heating and rolling as in the casting of the ingot.

While low carbon steel or practically carbon free iron can be used to advantage for the center, other compositions may be made use of to advantage when particular physical properties are desired. Cables with nickel steel centers have already been referred to, and various center materials may be made use of as chrome nickel steel centers and the like, where a product is desired to have a non-corrosive surface and at the same time to possess high physical properties.

Various non-corrosive surface alloys, preferably non-corrosive steels, may be used in accordance with my invention. Materials suitable for this purpose are described, for example, in my Patent No. 1,322,511 of Nov. 25, 1919, in British Patent No. 1,923 of 1872, in British Patent No. 13,414 of 1913, and in various other patents, those above referred to being merely by way of example. A non-corrosive material which I prefer to use for roofing sheets, for example, is "Delhi" containing carbon about .4%, silicon about 2%, chromium about 17%, and the principal part of the remainder iron, in combination with a center tube and inserted bar of mild steel of preferably under .2% of carbon.

For certain of the uses above enumerated, such as for the construction of jail bars, safes and bank vaults, it is desirable to select an alloy material, which in addition to being non-corrosive is also heat resisting, in order to resist the action of flame, such as oxy-acetylene flame, as may be employed by persons tampering with the structure. Furthermore, it is desirable to employ an alloy which is resistant to oxidation or corrosion either hot or cold.

I claim:

In the process of making wrought re-enforced metallic products, the steps of casting non-corrosive alloy steel about a thin tube of mild steel with heat non-conducting material in place in the tube whereby a weld union is secured between the unlike materials, removing the non-conducting material, inserting in the bore a bar of composition similar to the tube, and hot working the whole for elongation and reduction of cross section, as by rolling, whereby the bar portion is united to the tube portion.

In testimony that I claim the foregoing, I have hereto signed my name.

PERCY A. E. ARMSTRONG.